US011287043B2

(12) United States Patent
Manry (10) Patent No.: US 11,287,043 B2
(45) Date of Patent: Mar. 29, 2022

(54) HIGH CLEARANCE SEAL ASSEMBLY

(71) Applicant: Kaydon Ring & Seal, Inc., Baltimore, MD (US)

(72) Inventor: Jared Daniel Manry, Shrewsbury, PA (US)

(73) Assignee: KAYDON RING & SEAL, INC., Baltimore, MD (US)

( * ) Notice: Subject to any disclaimer, the term of this patent is extended or adjusted under 35 U.S.C. 154(b) by 265 days.

(21) Appl. No.: 16/530,371

(22) Filed: Aug. 2, 2019

(65) Prior Publication Data

US 2021/0033194 A1  Feb. 4, 2021

(51) Int. Cl.
| | | |
|---|---|---|
| *F16J 15/3256* | (2016.01) | |
| *F01D 11/00* | (2006.01) | |
| *F16J 15/54* | (2006.01) | |
| *F16J 15/3272* | (2016.01) | |

(52) U.S. Cl.
CPC ......... *F16J 15/3256* (2013.01); *F01D 11/003* (2013.01); *F16J 15/3272* (2013.01); *F16J 15/54* (2013.01)

(58) Field of Classification Search
CPC ...... F16J 15/3256; F16J 15/3272; F16J 15/54; F01D 11/003
See application file for complete search history.

(56) References Cited

U.S. PATENT DOCUMENTS

| | | | | |
|---|---|---|---|---|
| 2,867,458 A | * | 1/1959 | Kroekel | F16J 15/441 277/543 |
| 3,759,532 A | * | 9/1973 | Lindeboom | F16J 15/342 277/411 |
| 3,804,424 A | | 4/1974 | Gardner | |
| 3,874,677 A | * | 4/1975 | Ludwig | F16J 15/441 277/425 |

(Continued)

FOREIGN PATENT DOCUMENTS

| | | | |
|---|---|---|---|
| EP | 0803668 A1 | 10/1997 | |
| EP | 0995933 A2 | 4/2000 | |
| JP | 02271003 A | * 11/1990 | ............. F16J 15/406 |

OTHER PUBLICATIONS

Search Report from the British Patent Office dated Dec. 29, 2020 in related application No. GB2010393.3.

*Primary Examiner* — Eugene G Byrd
(74) *Attorney, Agent, or Firm* — J-Tek Law PLLC; Scott T. Wakeman; Mark A. Ussai (57) ABSTRACT

A seal assembly includes a seal disposed about a shaft and having an annular body with a radial sealing surface and an inner circumferential sealing surface engageable with the shaft. A housing is disposed about the shaft and has a first inner circumferential surface defining a first annular chamber about the shaft, the seal being disposed within the first annular chamber, a second inner circumferential surface spaced radially inwardly from the first inner circumferential surface and spaced from the outer surface of the shaft by a radial clearance so as to define a second annular chamber. A (Continued)

radial seal contact surface extends between the first and second inner circumferential surfaces and is sealingly engageable by the sealing surface of the seal to prevent flow between the two chambers, and circumferential pressure groove(s) are formed in the seal contact surface and are fluidly coupled with the first chamber.

17 Claims, 11 Drawing Sheets

(56) References Cited

U.S. PATENT DOCUMENTS

| | | | | |
|---|---|---|---|---|
| 4,082,296 A | * | 4/1978 | Stein | F16J 15/3412 277/400 |
| 4,943,069 A | * | 7/1990 | Jinnouchi | F16J 15/26 277/543 |
| 4,971,306 A | * | 11/1990 | Jinnouchi | F01D 11/003 277/544 |
| 5,445,394 A | * | 8/1995 | Dusserre-Telmon | F01D 11/003 277/422 |
| 5,516,118 A | | 5/1996 | Jones | |
| 6,145,843 A | * | 11/2000 | Hwang | F16J 15/442 277/400 |
| 6,338,490 B1 | * | 1/2002 | Bainachi | F16J 15/442 277/400 |
| 7,144,016 B2 | * | 12/2006 | Gozdawa | F16J 15/342 277/399 |
| 7,914,007 B2 | * | 3/2011 | Berard | F16J 15/3244 277/544 |
| 10,731,496 B2 | * | 8/2020 | DiFrancesco | F16C 19/36 |
| 10,781,709 B2 | * | 9/2020 | Sen | F01D 25/12 |
| 2016/0010483 A1 | * | 1/2016 | Miller | F16J 15/30 277/543 |

* cited by examiner

HIGH CLEARANCE SEAL ASSEMBLY

BACKGROUND OF THE INVENTION

The present invention relates to seals, and more particularly to circumferential "lift" seals for turbomachines and similar applications.

Circumferential seals are known and typically include an annular ring with an inner surface that seals about a rotating shaft and an axial end surface that seals against an adjacent housing surface. Certain circumferential seals include a segmented body having lift ramps formed on the seal inner surface, which cause the segments of the seal to displace radially outwardly during dynamic operation to reduce friction between the shaft and seal. In other applications, the seal is formed as a solid angular ring sized with an inside diameter greater than a shaft outside diameter, such that the seal "rides" on a fluid film between the shaft and seal. In either case, shaft offset can adversely affect performance of the seal.

SUMMARY OF THE INVENTION

In one aspect, the present invention is a seal assembly for sealing about a shaft rotatable about a central axis, the shaft having an outer circumferential surface. The seal assembly comprises a seal disposed about the shaft and including a generally annular body. The annular body has a first axial end, an opposing second axial end, a generally radial sealing surface on the first axial end, and an inner circumferential sealing surface sealingly engageable with the outer circumferential surface of the shaft. A housing is disposed about the shaft and has a first inner circumferential surface defining a first annular chamber about the shaft, the seal being disposed within the first annular chamber and a second inner circumferential surface spaced radially inwardly from the first inner circumferential surface and spaced from the outer surface of the shaft by a radial clearance so as to define a second annular chamber. Further, a radial seal contact surface extends radially between the first inner circumferential surface and the second inner circumferential surface, the radial sealing surface of the seal being sealingly engageable with the seal contact surface of the housing to prevent flow between the first chamber and the second chamber. At least one circumferential pressure groove is formed in the seal contact surface of the housing, the pressure groove being fluidly coupled with the first annular chamber.

In another aspect, the present invention is again a seal assembly for sealing about a shaft rotatable about a central axis, the shaft having an outer circumferential surface. The seal assembly comprises a seal disposed about the shaft and including a plurality of arcuate body segments. Each arcuate body segment has a first circumferential end and an opposing second circumferential end, each second circumferential end being coupled with the first circumferential end of an adjacent segment such that the plurality of body segments collectively form a generally annular seal body. The seal body has a first axial end, an opposing second axial end, a generally radial sealing surface on the first axial end, and an inner circumferential sealing surface sealingly engageable with the outer circumferential surface of the shaft. A housing is disposed about the shaft and has a first inner circumferential surface defining a first annular chamber about the shaft, the seal being disposed within the first annular chamber and a second inner circumferential surface spaced radially inwardly from the first inner circumferential surface and spaced from the outer surface of the shaft by a radial clearance so as to define a second annular chamber. Further, a radial seal contact surface extends radially between the first inner circumferential surface and the second inner circumferential surface, the radial sealing surface of the seal being sealingly engageable with the seal contact surface of the housing to prevent flow between the first chamber and the second chamber. At least one circumferential pressure groove is formed in the seal contact surface of the housing, the pressure groove being fluidly coupled with the first annular chamber.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-11 a seal assembly 10 for sealing about a shaft 1 rotatable about a central axis $A_C$, the shaft 1 having an outer circumferential surface 2 provided by a main shaft member 3 or a runner or sleeve (none shown) or other component mounted on the shaft member 3. Preferably, the shaft 1 is a component of a turbomachine, such as a process gas compressor, an aerospace turbine, etc., but may be used in any appropriate application. The seal assembly 10 basically comprises a seal 12 and a housing 14 each disposed about the shaft 1 so as to be substantially non-rotatable about the axis $A_C$, and associated components for positioning and aligning the seal 12 relative to the housing 14 and the shaft 1, as described below. The seal 12 includes a generally annular body 16 having a centerline $CL_S$, a first axial end 16a providing a generally radial sealing surface 18, an opposing second axial end 16b, an inner circumferential surface providing a sealing surface 20 sealingly engageable with the outer circumferential surface 2 of the shaft 1, and an opposing outer circumferential surface 21.

Figure 1:
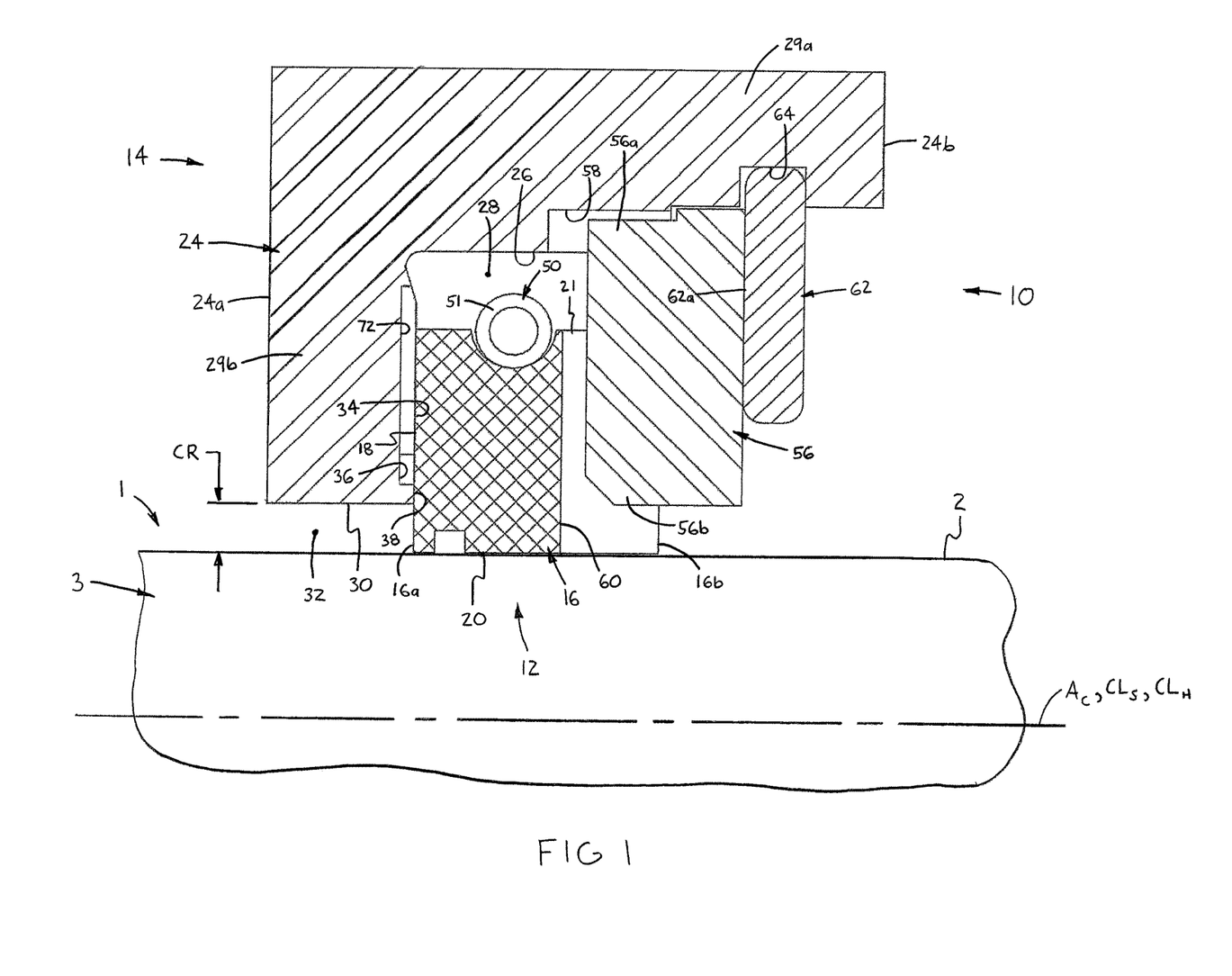
FIG. 1 is a broken-away, axial cross-sectional view of a seal assembly in accordance with the present invention, showing a seal, a housing and a shaft in a generally coaxial arrangement.
Figure 2:
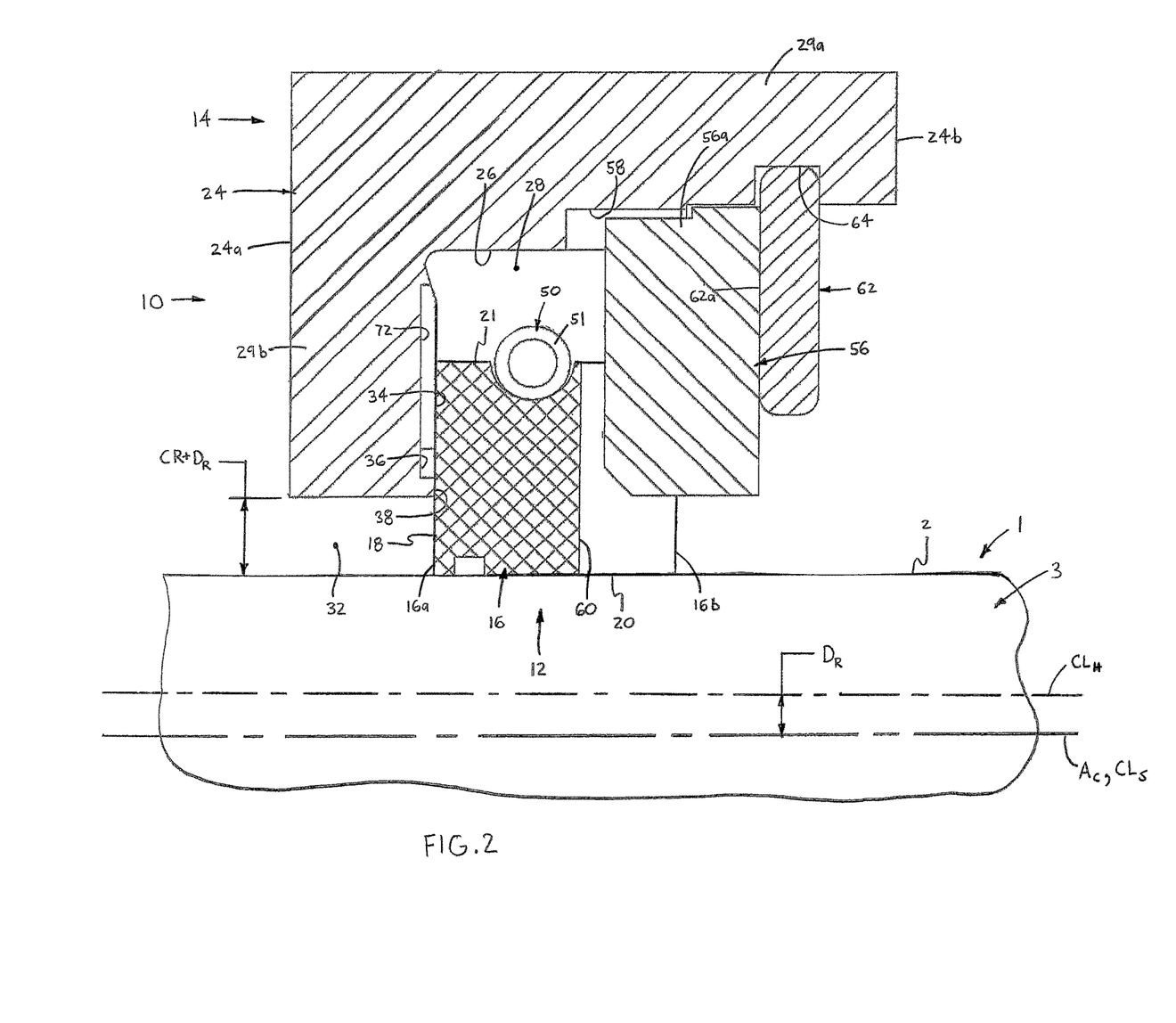
FIG. 2 is another view of the seal assembly of FIG. 1, showing a radial offset or displacement between the rotatable shaft and the fixed housing.
Figure 3:
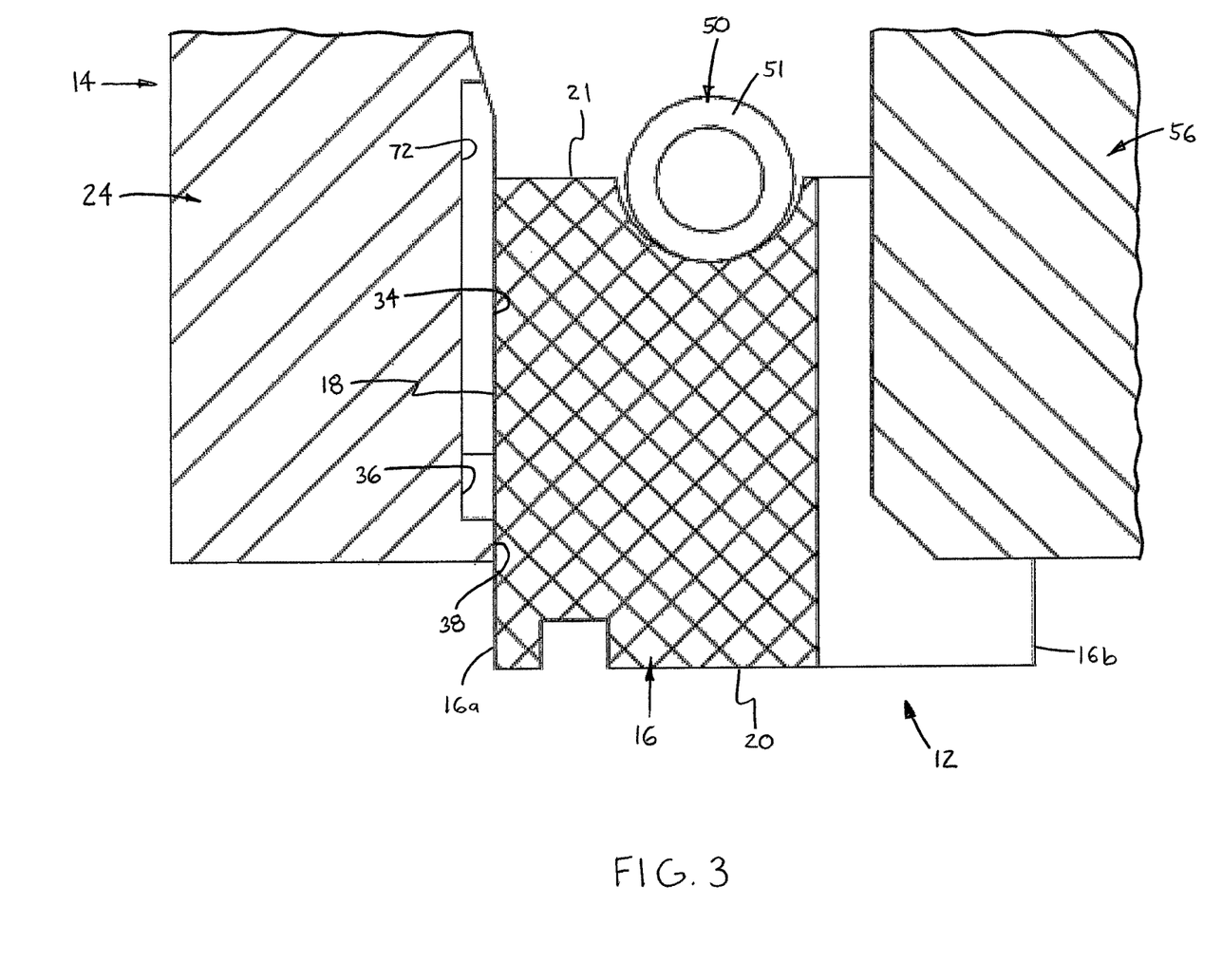
FIG. 3 is a broken-away, enlarged view of a portion of FIG. 1.
Figure 5:
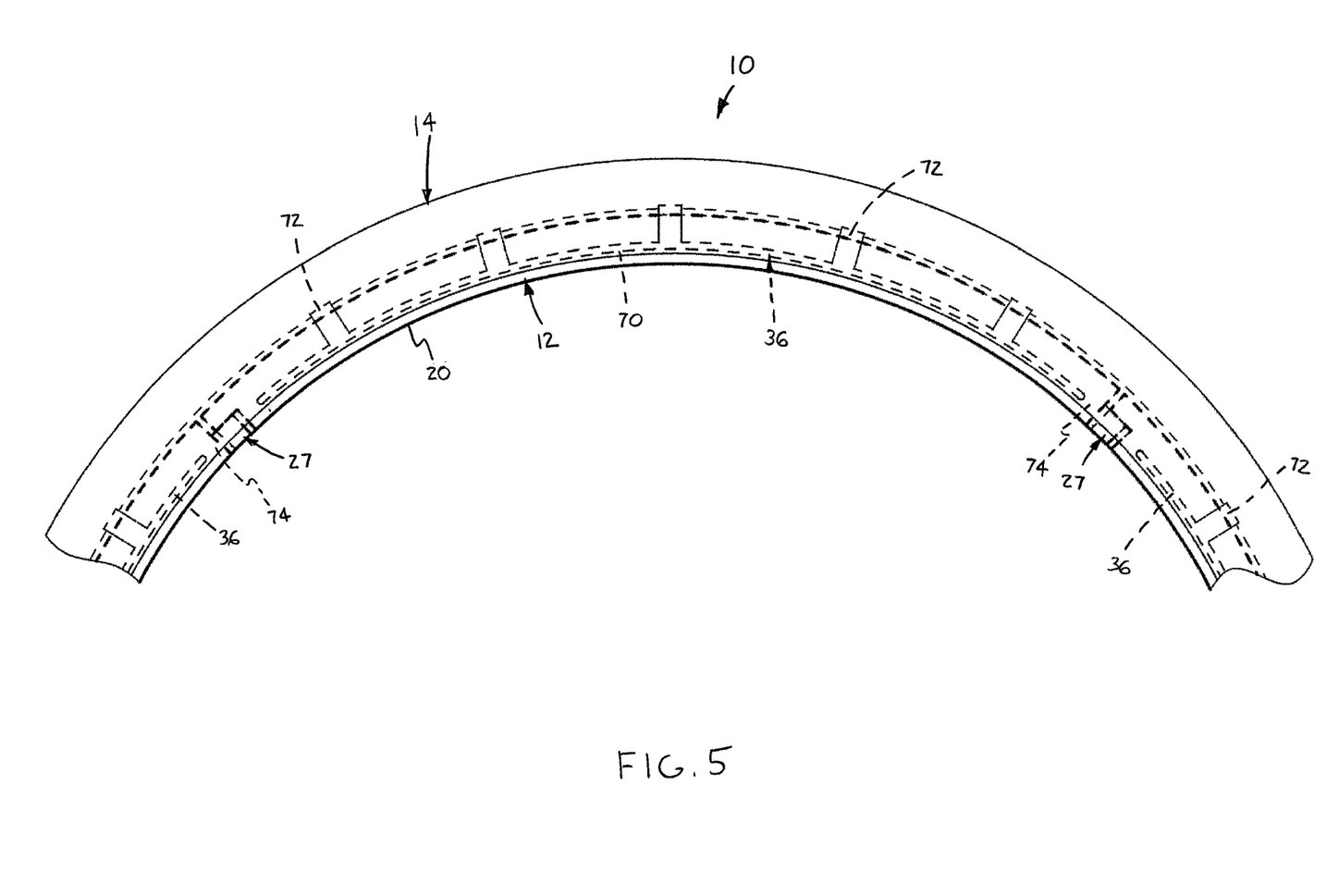
FIG. 5 is broken-away, side view of the seal assembly, showing the seal primarily hidden within the housing.
Figure 6:
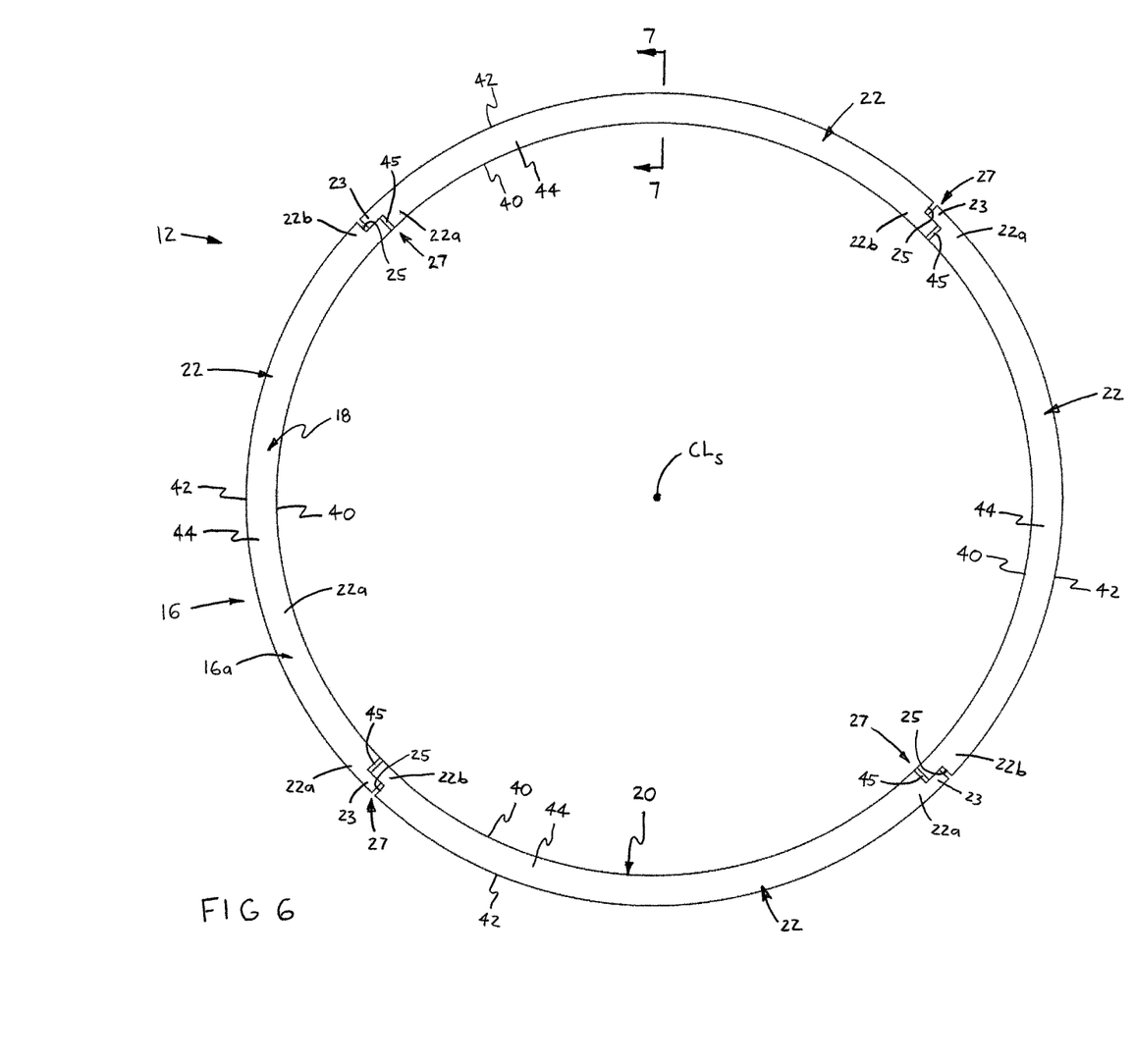
FIG. 6 is a side plan view of a segmented seal.
Figure 7:
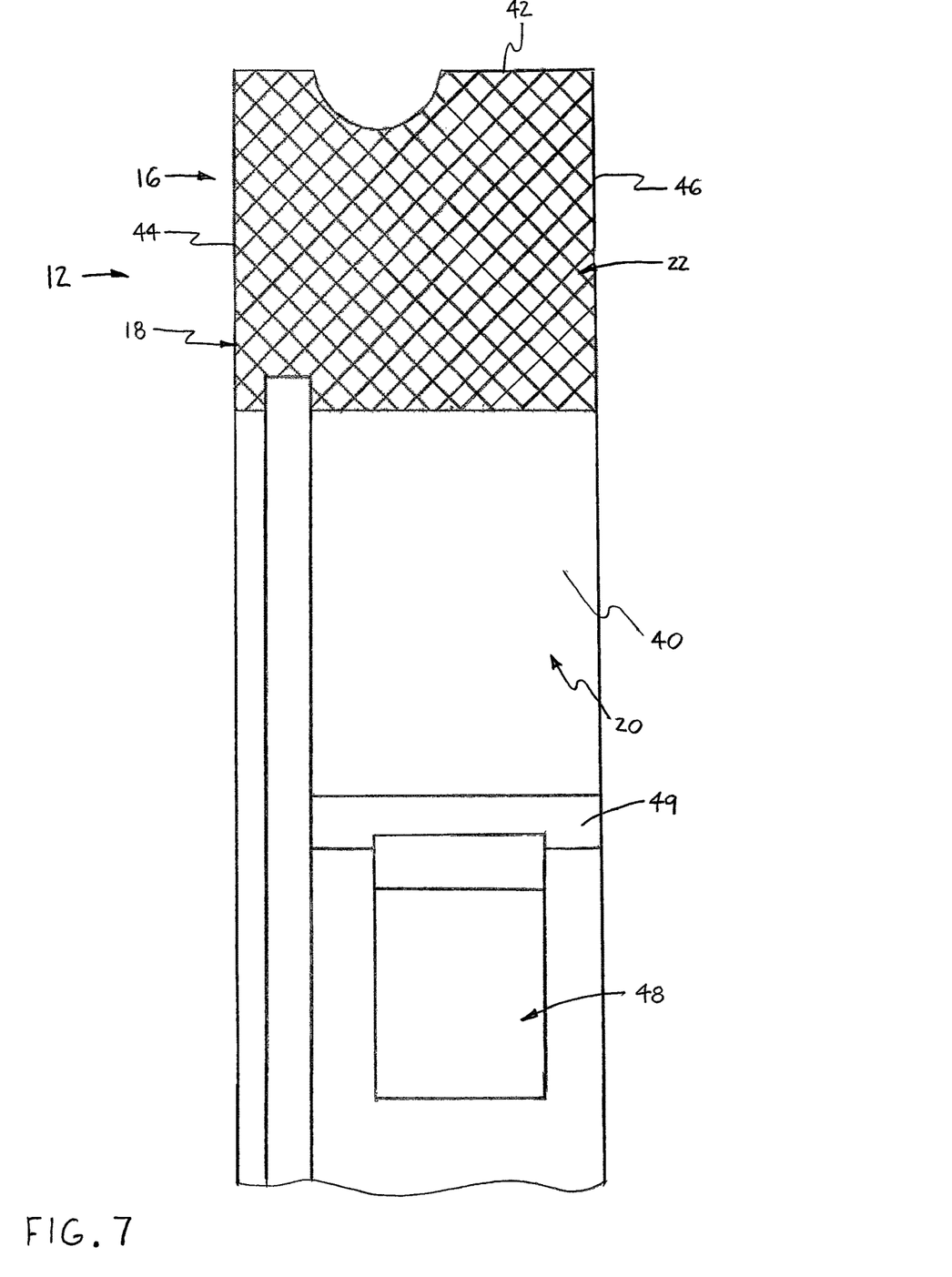
FIG. 7 is an axial cross-sectional view taken through line 7-7 of FIG. 6.

In certain applications as shown in FIGS. 5-7, the body 16 is formed of a plurality of arcuate body segments 22 coupled together to form the seal body 16 and collectively provide the ends 16a, 16b and the sealing surfaces 18, 20, as described in further detail below, but may alternatively be formed of a single, solid annular ring (not shown). With the segmented body 16, the seal 12 is radially displaceable between a radially-inward position, at which the seal inner surface 20 is sealingly engaged with the shaft outer surface 2 under static conditions (i.e., shaft 1 is non-rotational) and a radially-outward position, at which the seal inner surface 20 is spaced from the shaft outer surface 2 to reduce friction during shaft rotation. In other applications such as a "controlled gap seal", the seal body 16 is formed as a solid ring 80 (FIG. 8) having a continuous inner circumferential surface 82, providing the inner sealing surface 20, with an inside diameter (not indicated) sized sufficiently larger than the outside diameter (not indicated) of the shaft outer surface 2 such that a fluid film is present between the seal 12 and the shaft 1 during shaft rotation. In either case, the seal 12 is radially displaceable relative to the housing 14 in order to remain at least generally coaxial with the central axis $A_C$ of the shaft 1 when the shaft axis $A_C$ is offset from the housing centerline $CL_H$ by a radial distance $D_R$ due to static conditions (e.g., shaft installed offset from housing or vice-versa) or dynamic conditions (e.g., runout, vibration, etc.), as depicted in FIG. 2.

The housing 14 is configured to contain the seal 12 and includes a generally annular body 24 having a centerline $CL_H$ and opposing axial ends 24a, 24b, the centerlines $CL_S$, $CL_H$ of the seal 12 and the housing 14 preferably being at least generally coaxial with the shaft central axis $A_C$ when installed thereabout. Preferably, the housing 24 is generally L-shaped and includes an outermost axially-extending section 29a and an innermost radially-extending section 29b adjacent to the first axial end 24a, and may be of one-piece construction or formed of two or more connected components. Further, the housing 14 has a first inner circumferential surface 26 partially defining a first annular chamber 28 about the shaft 1, the seal 12 being disposed within the first annular chamber 28, and a second inner circumferential surface 30 spaced radially inwardly from the first inner circumferential surface 26. The housing second inner circumferential surface 30 is spaced radially outwardly from the outer surface 2 of the shaft 1 by a radial distance or "clearance" CR so as to define a second annular chamber 32. A radial seal contact surface 34 extends radially between the first inner circumferential surface 26 and the second inner circumferential surface 30. The radial sealing surface 18 of the seal 12 is sealingly engageable with the seal contact surface 34 of the housing 14 to prevent flow between the first chamber 28 and the second chamber 32.

Furthermore, at least one circumferential pressure groove 36 is formed in the seal contact surface 34 of the housing 14 and is fluidly coupled with the first annular chamber 28. As such, during operation of the machine, a portion of a quantity of fluid within the first annular chamber 28, which is typically pressurized to at least one pound per square inch (1 psi) greater than fluid pressure within the second chamber 32, flows into the groove 36 and exerts pressure against the sealing surface 18 of the seal 12. Thereby, contact forces between the seal 12 and the housing 14 are reduced, which decreases frictional forces between the surfaces 18, 34 and thereby reduces wear on the seal body 16. Typically, the seal body 16 is formed of carbon and the housing body 24 is formed of a metallic material, such that the seal 12 generally experiences greater wear than the housing 14 during the functional life of the seal assembly 10, but the seal body 16 and/or the housing body 24 may be formed of any other appropriate materials.

With previously known seal assemblies, the pressure groove(s) is/are formed on the sealing surface of the seal body, such that an uninterrupted radial "dam" surface section of the sealing surface is provided between the radially-inner edge of the seal surface and the radially-inner edge of the pressure groove. A portion of the dam surface section must always be engaged with the housing contact surface to prevent flow between the seal and housing surfaces. Due to the radial movement of the seal between a "centered" position, at which the shaft axis is at least generally coaxial with the housing centerline, and an offset position at which the shaft axis is radially displaced from the housing centerline, the dam surface section must have a radial length or distance of at least the radial clearance (i.e., between the housing and the shaft) plus the maximum radial displacement of the shaft. Also, to account for wear on the seal inner surface or "bore", additional dam surface length must be provided. As such, if it is desired to increase the radial clearance, the dam surface section on the seal must be increased, and such an increase in the seal dam surface increases axial contact force and affects the balance of pressure on the seal.

However, in the present invention, by forming the pressure groove 36, and thus the dam surface, on the housing 14, the dam surface can have a reduced or lesser radial length while still maintaining contact with the displaceable seal 12, which in turn enables an increase in the radial clearance CR. Specifically, a dam surface section 38 of the radial surface 34 of the housing 14 is defined between an inner radial edge 34a of the radial surface 34 and the inner radial edge 36a of the circumferential pressure groove 36. Due to the entire sealing surface 18 of the seal 12 being continuous and smooth, i.e., without grooves or other discontinuations (except at the joints) as described below, the dam surface section 38 remains in sealing engagement with the seal 12 during shaft and seal radial displacement through a radial distance $D_R$ (FIG. 2).

Preferably, the dam surface section 38 has a radial length or "height" $D_H$ (FIG. 11) with a value substantially less than twice the value of the radial clearance CR between the housing 14 and the shaft 1, and preferably substantially less than the value of the clearance CR. Further, with the structure of the pressure groove 36 and the dam surface 38 being formed on the housing 14 and a smooth sealing surface 18 provided on the seal 12, the radial clearance CR can be made greater or larger as compared with previously known seal assemblies and still maintain sealing engagement between the surfaces 18 and 34, and preferably has a value of at least thirty thousandths of an inch (0.030"). Having described the basic components and functions above, these and other details of seal assembly 10 of the present invention will be described in further detail below.

Referring to FIGS. 6 and 7, with the preferred "segmented" seal body 16, each seal arcuate body segment 22 has a first circumferential end 22a, an opposing second circumferential end 22b, an inner circumferential surface section 40, an opposing outer circumferential surface section 42, a first radial surface section 44 and an opposing second radial surface section 46 (FIG. 7). Each second circumferential end 22b of each one of the segments 22 is coupled with the first circumferential end 22a of an adjacent segment 22 such that the plurality of body segments 22 collectively form the annular seal body 16. Preferably, the body segments 22 are coupled by means of projection 23 formed at each segment first end 22a being "loosely" disposed within a socket 25 formed at each segment second end 22b to form a joint 27. Further, the first radial surface sections 44 of the plurality of segments 22 collectively form the radial sealing surface 18 of the seal 12 and the inner circumferential surface sections 40 of the plurality of segments 22 collectively form the inner circumferential sealing surface 20 of the seal 12. With the pressure groove 36 being formed in the housing contact surface 34, the radial sealing surface 18 of the seal body 16 is substantially smooth and flat (e.g., has a flatness of about 0.001"). However, with a seal body 16 formed of the arcuate body segments 22, the sealing surface 18 is provided by the separate radial surface sections 44 of the segments 22 and therefore includes a plurality of gaps 45, each gap 45 being located at a separate joint 27.

Figure 8:
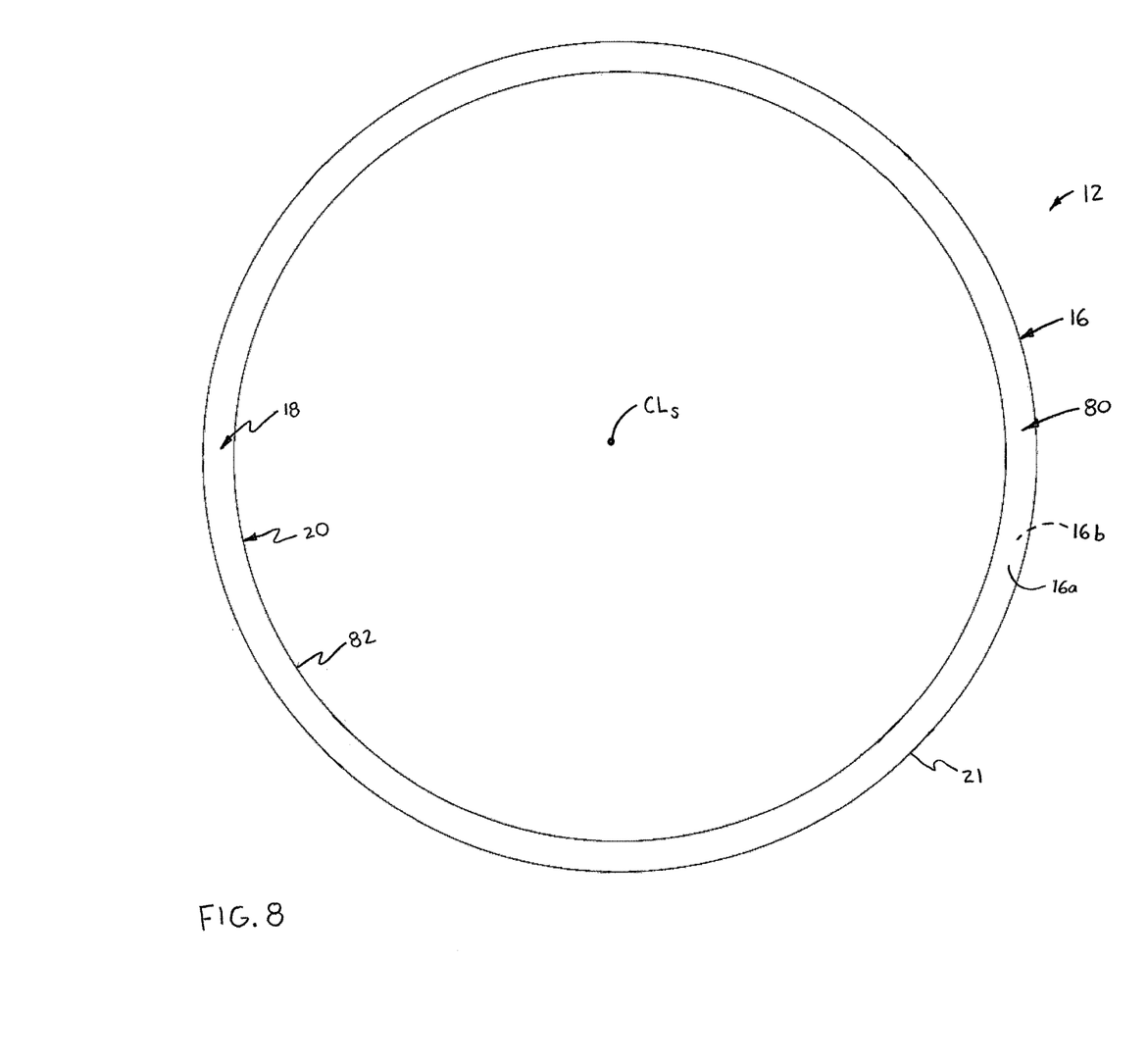
FIG. 8 is a side plan view of a solid ring seal.

Referring particularly to FIG. 7, with a segmented seal body 16, each body segment 22 preferably includes at least one and most preferably a plurality of lift pockets 48 (e.g., three, only one shown) are each formed on the inner circumferential surface section 40 of each body segment 22. Each lift pocket 48 is configured to generate a radially-outwardly directed force to radially displace the associated arcuate segment 22 outwardly from the shaft outer surface 2 during rotation of the shaft 1. Specifically, a portion of the fluid passing between the rotating shaft 1 and the inner surface 20 of the seal 12 passes through one or more axial feed slots 49 and is directed into the pocket(s) 48, the fluid increasing in pressure within the pockets 48 and biasing each arcuate body segment 22 generally radially outwardly to displace off of the shaft surface 2. However, with a solid seal body 16 as shown in FIG. 8, the seal body 16 does not include any type of lift pocket and related slots or grooves and instead has an inner circumferential surface 82 that is substantially smooth and continuous.

Referring to FIGS. 1-4, in order to maintain engagement of the inner circumferential sealing surface 20 of a seal 12 with the shaft outer surface 2 when the seal body 16 is segmented, the seal assembly 10 preferably further includes an annular biasing member 50 disposed about the plurality of arcuate body segments 22. The biasing member 50 is configured to bias the body segments 22 radially inwardly toward the central axis $A_C$, thereby retaining the segment projections 23 within the segment sockets 25 and the integrity of the annular body 16. Preferably, the biasing member 50 is a generally circular garter spring 51, but may be any other appropriate device capable of radially biasing the segments 22.

Figure 4:
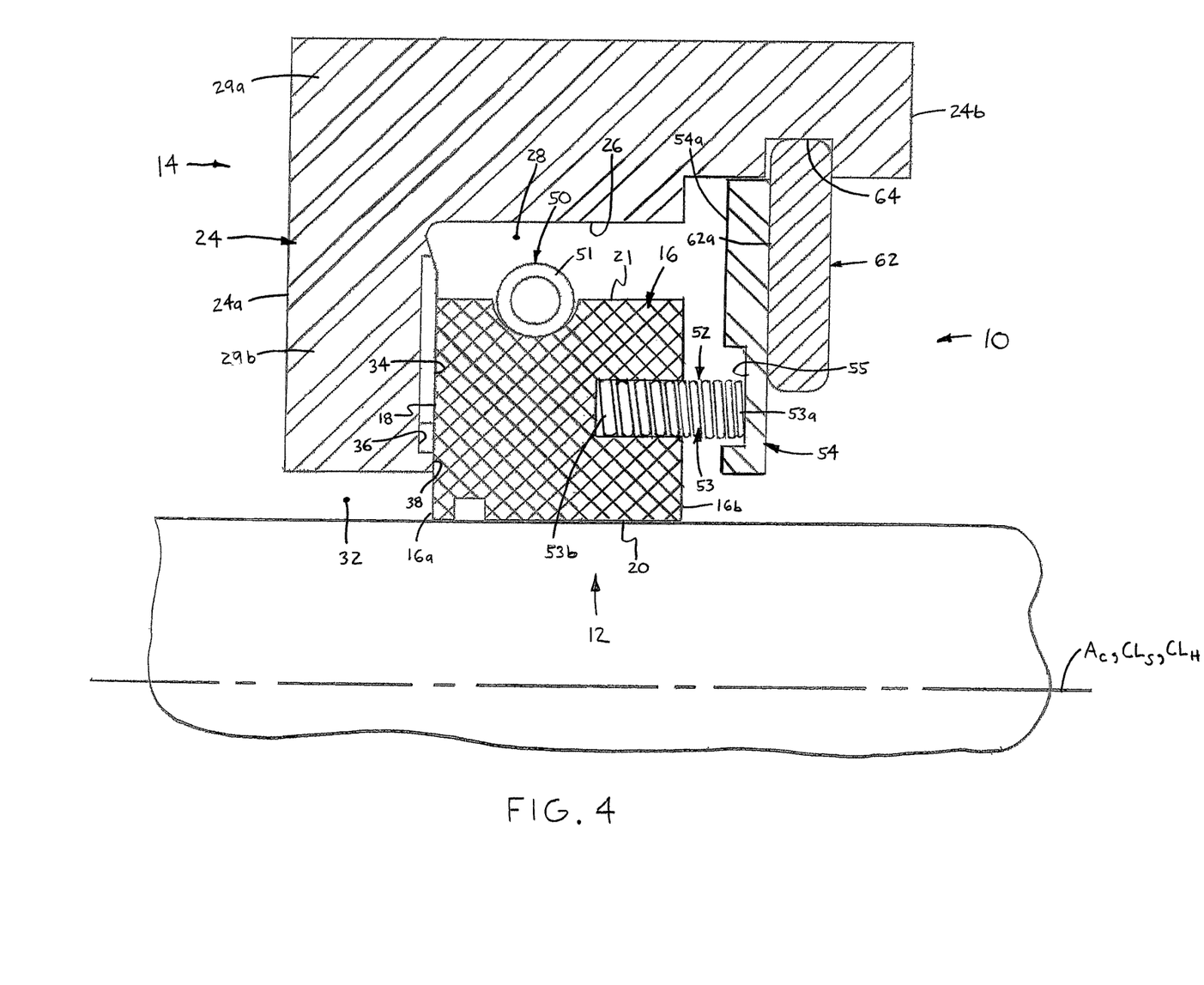
FIG. 4 is another broken-away, axial cross-sectional view of the seal assembly, showing a biasing spring and a spring plate.

Referring specifically to FIG. 4, with either a segmented or solid seal body 16, the seal assembly 10 also preferably includes at least one and preferably a plurality of axial biasing members 52 (only one shown), most preferably compression coil springs 53. Each spring 53 is configured to bias the seal 12 generally axially toward the seal contact surface 34 of the housing 14, so as to maintain sealing engagement between the radial sealing surface 18 and the seal contact surface 34. Preferably, the seal assembly 10 also includes an annular spring retainer plate 54 coupled with the housing 14 and spaced axially from the seal 12, specifically away from the seal second axial end 16b. With such a spring plate 54, each spring 53 has a first end 53a disposed against or coupled with the retainer plate 54 and a second end 53b disposed against/coupled with the seal body 16, and extends axially between the plate 54 and the seal 12. The retainer plate 54 preferably includes a plurality of retainer pockets 55 (only one shown) extending axially inwardly from an axial end 54a of the plate 54, such that each spring first end 53a is disposed within a separate one of the pockets 55, but may alternatively be disposed against the axial end 54a.

Furthermore, the seal assembly 10 also preferably includes at least one anti-rotation member 56 having a first end 56a connected with the housing 14 and a second end 56b coupled with the seal 12, and is preferably formed as a generally rectangular bar or lug. The anti-rotation member(s) 56 are preferably integrally formed with the retainer plate 54, but may be made as separate members coupled with the plate 54. Each anti-rotation member 56 is configured to prevent angular displacement of the seal 12 about the central axis $A_C$, i.e., by movably coupling the seal 12 with the housing 14. Preferably, the housing 14 includes at least one and preferably a plurality of openings 58 extending radially outwardly from the housing first inner circumferential surface 26 and the seal body 16 includes at least one and preferably a plurality of openings 60 extending radially inwardly from the seal outer circumferential surface 21 and radially aligned with a separate one of the housing openings 58. With such openings 58, 60, the first end 56a of each anti-rotation member 56 is disposed within the housing opening 58 and the second end 56b of each member 56 is disposed within the aligned seal opening 60.

Furthermore, to retain the spring plate 54 and/or the anti-rotation member 56 (if separate from plate 54) within the housing 14, the seal assembly 10 preferably further includes a retainer clip 62, preferably a C-clip. The retainer clip 62 is coupled with a groove 64 extending outwardly from the inner surface 26 of the housing 14 and has an axial end 62a against which the plate 54 is disposed. Also, the seal assembly 10 may include one or more outer casings (none shown) for containing the housing 14 and coupling the seal assembly 10 with other components of the turbomachine.

Figure 9:
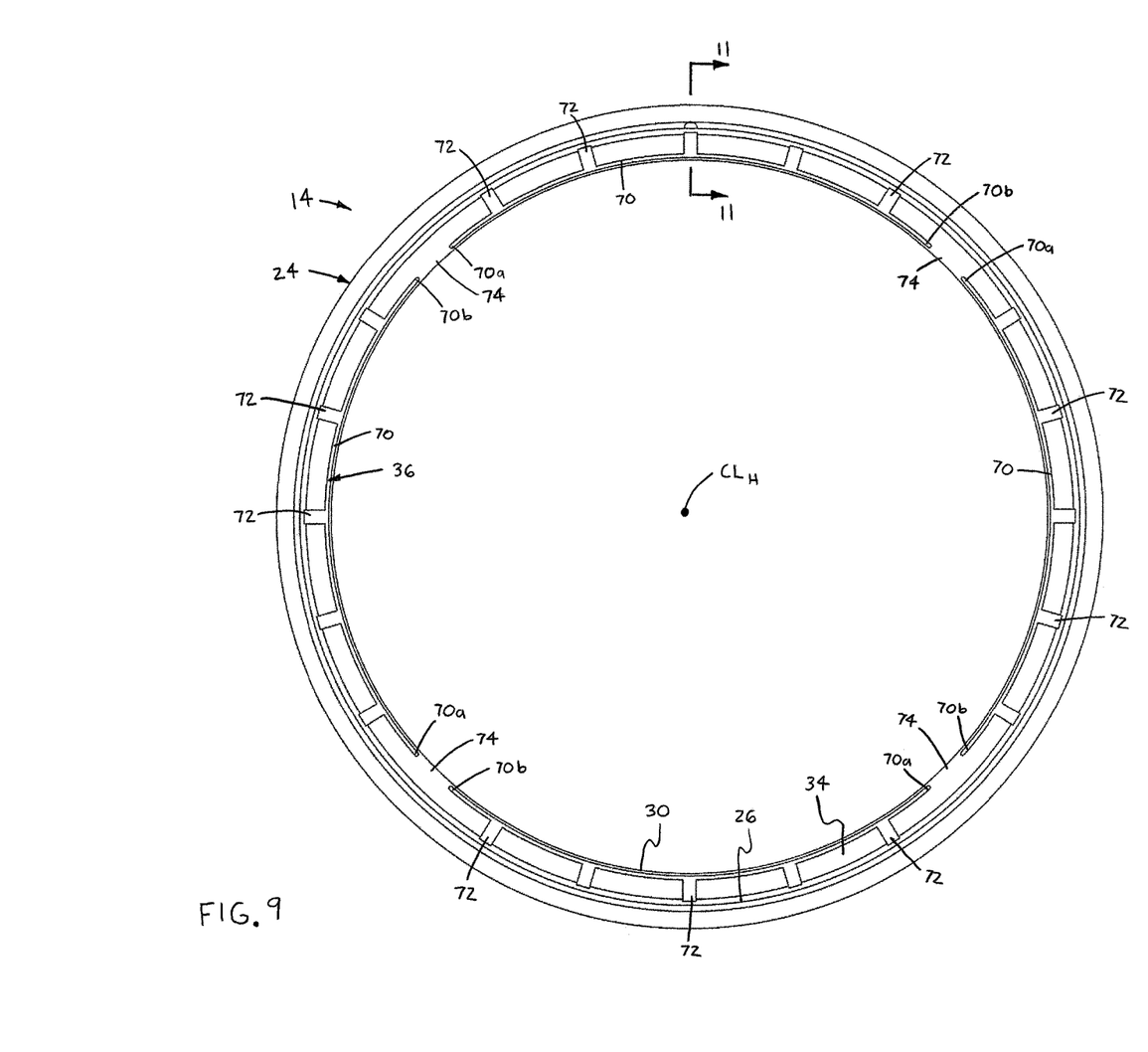
FIG. 9 is a side plan view of a housing of the seal assembly.
Figure 10:
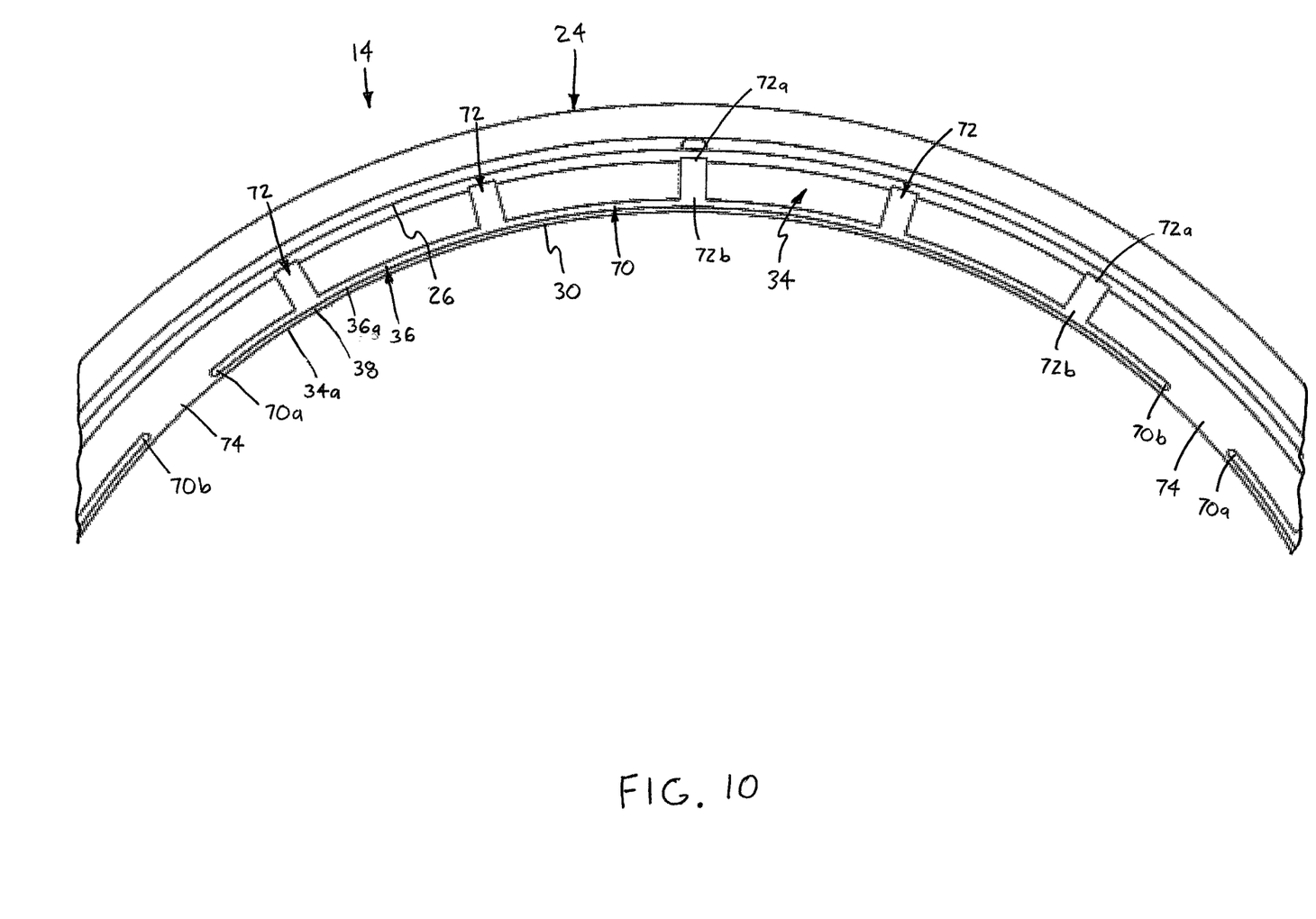
FIG. 10 is a broken-away, enlarged view of a portion of FIG. 9.
Figure 11:
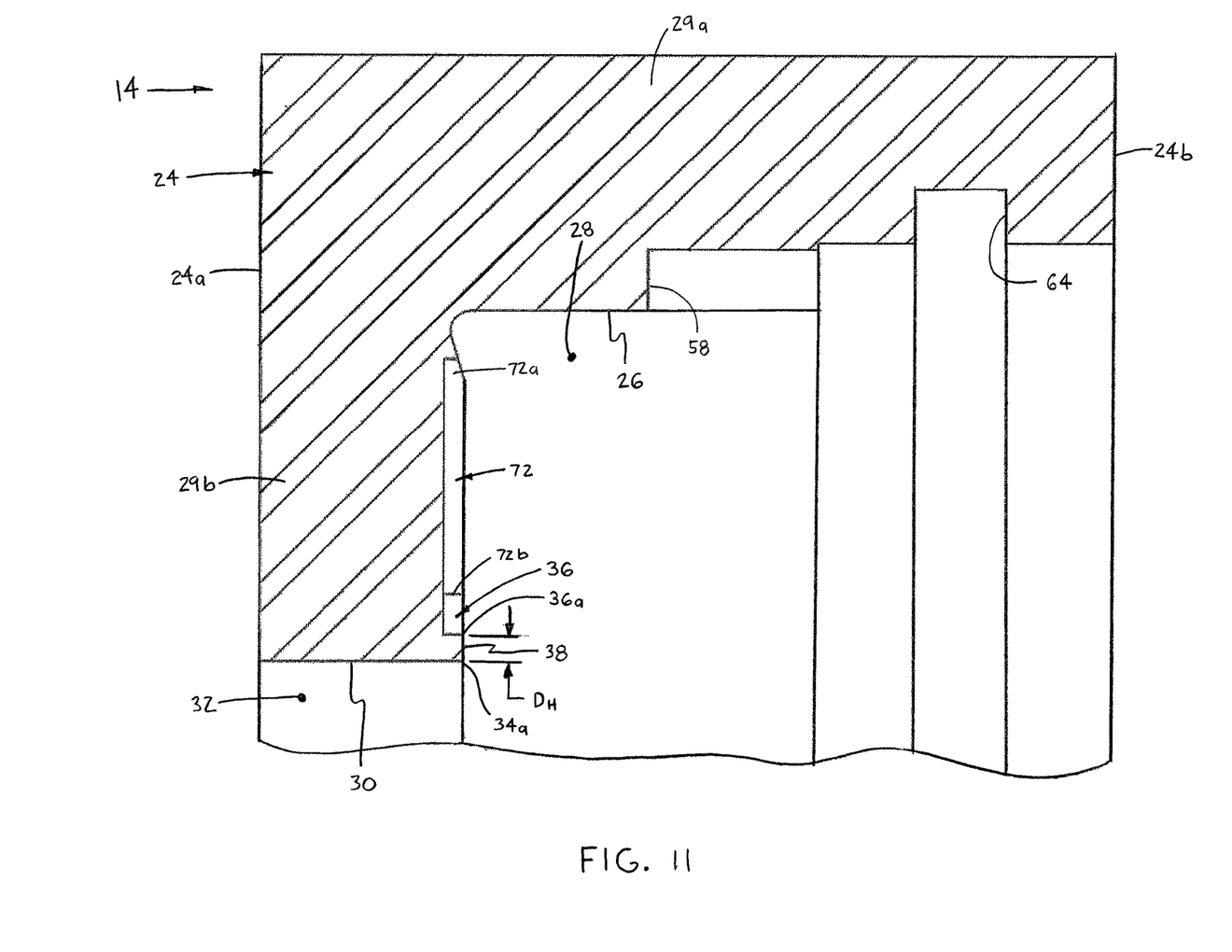
FIG. 11 is an axial cross-sectional view taken through line 11-11 of FIG. 9.

Referring now to FIGS. 9-11, with a "segmented" seal body 16 as discussed above, the at least one pressure groove 36 preferably includes a plurality of arcuate groove segments 70 spaced circumferentially about the housing centerline $CL_H$, and thus the central axis $A_C$, and a plurality of radial feed slots 72, at least one and preferably five slots 72 per each groove segment 70. Each pressure groove segment 70 has opposing first and second circumferential ends 70a, 70b, the first circumferential end 70a of each groove segment 70 being spaced circumferentially apart from the second circumferential end 70b of an adjacent groove segment 70 so as to define one of a plurality of barrier surface sections 74, as described in further detail below. Further, each feed slot 72 has an outer radial end 72a coupled with the first annular chamber 28 and an inner radial end 72b coupled with one of the groove segments 70. As such, each groove segment 70 is fluidly coupled with the first annular chamber 28 through at least one of the feed slots 72. Thereby, fluid within the chamber 28 flows into the outer radial end 72a of each feed slot 72, passes through the slot 72 and out of the inner radial end 72b, to thereafter accumulate within the connected arcuate pressure groove segment 70.

As best shown in FIG. 5, with the above-groove structure, the seal 12 is positioned within the first chamber 28 of the housing 14 such that each barrier surface section 74 is located adjacent to a separate one of the joints 27 of the seal body 16 so as to prevent flow between the pressure groove 36 and the joints 27. In other words, if the groove 36 was circumferentially continuous and extended adjacent to the one or more joints 27, fluid within the groove 36 would pass out through the joints 27 and increase fluid leakage through the seal 12. Thus, the barrier sections 74 are provided, and the seal joints 27 are positioned adjacent thereto, in order to ensure sufficient sealing surface engagement or coverage.

When the seal body 16 is provided by a solid ring 80, the pressure groove 36 may be formed as a plurality of arcuate groove segments 70 as described above and depicted in FIGS. 9 and 10, but may alternatively be formed as a single circular groove (not shown) extending entirely circumferentially about the housing centerline $CL_H$. In either case, the continuous or uninterrupted radial sealing surface 18 provided by the ring 80 eliminates the necessity of the barrier surface sections 74.

Although depicted and described in the present disclosure as a single seal 12, the seal assembly 10 may include two seals 12 spaced axially apart (i.e., a "tandem" seal arrangement) and each disposed about the shaft 1. One seal 12 is sealingly engageable with the radial contact surface 34 of the housing 14 as described above, while the other seal 12 is sealingly engageable with a second radial seal contact surface (not shown) of the housing 14 or a second housing (not shown). Such a second radial seal contact surface is spaced axially apart from, and generally facing, the contact surface 34, and is provided with a pressure groove (not shown) generally as described above. The second seal contact surface and the second pressure groove may be provided by the housing 14, by an insert or ring coupled with the housing 14, or by a second housing disposed adjacent to the housing 14 and enclosing the second seal 12.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. A seal assembly for sealing about a shaft rotatable about a central axis, the shaft having an outer circumferential surface, the seal assembly comprising:
    a seal disposed about the shaft and including a generally annular body having a first axial end, an opposing second axial end, a generally radial sealing surface on the first axial end, and an inner circumferential sealing surface sealingly engageable with the outer circumferential surface of the shaft; and
    a housing disposed about the shaft and having a first inner circumferential surface defining a first annular chamber about the shaft, the seal being disposed within the first annular chamber, a second inner circumferential surface spaced radially inwardly from the first inner circumferential surface and spaced from the outer surface of the shaft by a radial clearance so as to define a second annular chamber, a radial seal contact surface extending radially between the first inner circumferential surface and the second inner circumferential surface, the radial sealing surface of the seal being sealingly engageable with the seal contact surface of the housing to prevent flow between the first chamber and the second chamber, and at least one circumferential pressure groove formed in the seal contact surface of the housing, the pressure groove being fluidly coupled with the first annular chamber;
    wherein a dam surface section of the radial surface of the housing is defined between an inner radial edge of the radial surface and the circumferential pressure groove, the dam surface section having a radial height with a value less than a value of the radial clearance between the housing and the shaft.

2. The seal assembly as recited in claim 1 wherein the radial clearance has a value of at least thirty thousandths of an inch (0.030").

3. The seal assembly as recited in claim 1 wherein fluid pressure within the pressure groove reduces contact force between the seal and the housing.

4. The seal assembly as recited in claim 1 wherein the seal body includes one of:
    a solid annular ring; and
    a plurality of arcuate body segments, each arcuate segment having a first circumferential end and an opposing second circumferential end, each second circumferential end being coupled with the first circumferential end of an adjacent segment such that the plurality of body segments collectively form the seal annular body.

5. The seal assembly as recited in claim 4 wherein each one of the plurality of arcuate body segments has an inner circumferential surface section, the inner circumferential surface section of the plurality of segments collectively forming the seal body inner circumferential surface, and at least one lift pocket formed on the inner circumferential surface section of each body segment, each lift pocket being configured to generate a force to radially displace the arcuate segment outwardly from the shaft outer surface during rotation of the shaft.

6. The seal assembly as recited in claim 1 wherein the seal further comprising an annular biasing member disposed about the plurality of arcuate body segments and configured to bias the segments radially inwardly toward the central axis.

7. The seal assembly as recited in claim 1 wherein the radial sealing surface of the seal body is substantially smooth.

8. The seal assembly as recited in claim 1 wherein the at least one pressure groove includes a plurality of arcuate groove segments spaced circumferentially about the central axis and a plurality of radial feed slots, each feed slot having an outer radial end coupled with the first annular chamber and an inner radial end coupled with one of the groove segments such that each groove segment is fluidly coupled with the first annular chamber through at least one of the feed slots.

9. The seal assembly as recited in claim 8 wherein:
    the seal body includes a plurality of arcuate body segments, each arcuate body segment having a first circumferential end and an opposing second circumferential end, each second circumferential end being coupled with the first circumferential end of an adjacent segment to form a seal joint; and the contact surface of the housing includes a plurality of barrier surface sections, each barrier surface section being defined between each pair of adjacent pressure groove segments, the plurality of groove segments being spaced circumferentially about the central axis such that each barrier surface section is located adjacent to a separate one of the joints of the seal body to prevent flow between the pressure groove and the joint.

10. The seal assembly as recited in claim 1 further comprising:
an annular retainer plate coupled with the housing and spaced axially from the seal;
at least one spring extending between the retainer and the seal and configured to bias the seal toward the seal contact surface of the housing; and
at least one anti-rotation member having a first end connected with the housing and a second end coupled with the seal, the anti-rotation member being configured to prevent angular displacement of the seal about the central axis.

11. A seal assembly for sealing about a shaft rotatable about a central axis, the shaft having an outer circumferential surface, the seal assembly comprising:
a seal disposed about the shaft and including a plurality of arcuate body segments, each arcuate body segment having a first circumferential end and an opposing second circumferential end, each second circumferential end being coupled with the first circumferential end of an adjacent segment to form a seal joint, the plurality of body segments collectively forming a generally annular seal body, the seal body having a first axial end, an opposing second axial end, a generally radial sealing surface on the first axial end, and an inner circumferential sealing surface sealingly engageable with the outer circumferential surface of the shaft; and
a housing disposed about the shaft and having a first inner circumferential surface defining a first annular chamber about the shaft, the seal being disposed within the first annular chamber, a second inner circumferential surface spaced radially inwardly from the first inner circumferential surface and spaced from the outer surface of the shaft by a radial clearance so as to define a second annular chamber, a radial seal contact surface extending radially between the first inner circumferential surface and the second inner circumferential surface, the radial sealing surface of the seal being sealingly engageable with the seal contact surface of the housing to prevent flow between the first chamber and the second chamber, a plurality of arcuate pressure groove segments formed in the seal contact surface of the housing and spaced circumferentially about the housing centerline a plurality of radial feed slots each having an outer radial end coupled with the first annular chamber and an inner radial end coupled with one of the arcuate pressure groove segments and a plurality of barrier surface sections, each barrier surface section being defined between each pair of adjacent pressure groove segments;
wherein the seal is positioned within the first annular chamber of the housing such that each barrier surface section is located adjacent to a separate one of the joints of the seal body so as to prevent flow between the pressure groove segments of the housing and the joints of the seal.

12. The seal assembly as recited in claim 11 wherein the radial clearance has a value of at least thirty thousandths of an inch (0.030").

13. The seal assembly as recited in claim 11 wherein fluid pressure within the pressure groove reduces contact force between the seal and the housing.

14. The seal assembly as recited in claim 11 wherein each one of the plurality of arcuate body segments has an inner circumferential surface section, the inner circumferential surface section of the plurality of segments collectively forming the seal body inner circumferential surface, and at least one lift pocket formed on the inner circumferential surface section of each body segment, each lift pocket being configured to generate a force to radially displace the arcuate segment outwardly from the shaft outer surface during rotation of the shaft.

15. The seal assembly as recited in claim 11 wherein the seal further comprises an annular biasing member disposed about the plurality of arcuate body segments and configured to bias the segments radially inwardly toward the central axis.

16. The seal assembly as recited in claim 11 wherein a dam surface section of the radial surface of the housing is defined between an inner radial edge of the radial surface and the circumferential pressure groove, the dam surface section having a radial height with a value lesser than twice a value of the radial clearance between the housing and the shaft.

17. A seal assembly for sealing about a shaft rotatable about a central axis, the shaft having an outer circumferential surface, the seal assembly comprising:
a seal disposed about the shaft and including a generally solid annular ring having a first axial end, an opposing second axial end, a generally radial sealing surface on the first axial end, and an inner circumferential sealing surface sealingly engageable with the outer circumferential surface of the shaft; and
a housing disposed about the shaft and having a first inner circumferential surface defining a first annular chamber about the shaft, the seal being disposed within the first annular chamber, a second inner circumferential surface spaced radially inwardly from the first inner circumferential surface and spaced from the outer surface of the shaft by a radial clearance so as to define a second annular chamber, a radial seal contact surface extending radially between the first inner circumferential surface and the second inner circumferential surface, the radial sealing surface of the seal being sealingly engageable with the seal contact surface of the housing to prevent flow between the first chamber and the second chamber, and at least one circumferential pressure groove formed in the seal contact surface of the housing, the pressure groove being fluidly coupled with the first annular chamber;
wherein a dam surface section of the radial surface of the housing is defined between an inner radialedge of the radial surface and the circumferential pressure groove the dam surface section having a radial height with a value less than a value of the radial clearance between the housing and the shaft.

* * * * *